United States Patent
Yu et al.

(10) Patent No.: US 11,509,111 B2
(45) Date of Patent: Nov. 22, 2022

(54) ALL-SOLID-STATE HIGH-POWER SLAB LASER BASED ON PHONON BAND EDGE EMISSION

(71) Applicant: SHANDONG UNIVERSITY, Jinan (CN)

(72) Inventors: Haohai Yu, Jinan (CN); Huaijin Zhang, Jinan (CN); Jinheng Du, Jinan (CN); Jiyang Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 64 days.

(21) Appl. No.: 16/600,202

(22) Filed: Oct. 11, 2019

(65) Prior Publication Data
US 2020/0044409 A1    Feb. 6, 2020

Related U.S. Application Data

(63) Continuation of application No. PCT/CN2019/076480, filed on Feb. 28, 2019.

(30) Foreign Application Priority Data

Dec. 11, 2018 (CN) ......................... 201811508679.X (51) Int. Cl.
*H01S 3/0941* (2006.01)
*H01S 3/093* (2006.01)
(Continued)

(52) U.S. Cl.
CPC .......... *H01S 3/0941* (2013.01); *H01S 3/0606* (2013.01); *H01S 3/0615* (2013.01);
(Continued)

(58) Field of Classification Search
CPC ............... H01S 3/0606; H01S 3/09415; H01S 3/09403; H01S 3/094049–094057;
(Continued)

(56) References Cited

U.S. PATENT DOCUMENTS

| | | | | |
|---|---|---|---|---|
| 5,130,996 A | * | 7/1992 | Amano | H01S 3/09415 372/71 |
| 5,187,714 A | * | 2/1993 | Okazaki | H01S 3/042 359/326 |
| 5,659,567 A | * | 8/1997 | Roberts | H01S 3/0915 372/98 |
| 6,160,824 A | * | 12/2000 | Meissner | H01S 3/0632 372/39 |

(Continued)

FOREIGN PATENT DOCUMENTS

| | | | |
|---|---|---|---|
| CN | 201623359 U | * | 11/2010 |
| CN | 105071217 A | * | 11/2015 |

(Continued)

OTHER PUBLICATIONS

Fang et al., "Self-Frequency-Doubled Vibronic Yellow Yb:YCOB Laser at the Wavelength of 570 nm", Mar. 1, 2016, Optics Letters, vol. 41, No. 5, p. 1002-1005. (Year: 2016).*

*Primary Examiner* — Joshua King (57) ABSTRACT

A kind of all-solid-state high-power slab laser based on phonon band-edge emission, which is comprised of a pumping source, a focusing system, a resonant cavity and a self-frequency-doubling crystal; the said self-frequency-doubling crystal is a Yb-doped RECOB crystal cut into slab shape along the direction of the crystal's maximum effective nonlinear coefficient of its non-principal plane; by changing the cutting direction of the crystal, the phase matching of different wavelengths is realized, thus realizing laser output at the band of 560-600 nm; the said pumping source is a diode laser matrix with a wavelength of 880 nm-980 nm; the input cavity mirror and the output cavity mirror are coated with films to obtain laser output at the band of 560-600 nm; the two large faces of the said self-frequency-doubling crystal is cooled by heat sink and located between the input cavity mirror and the output cavity mirror.

11 Claims, 6 Drawing Sheets

(51) Int. Cl.
*H01S 3/109* (2006.01)
*H01S 3/06* (2006.01)
*H01S 3/094* (2006.01)
*H01S 3/16* (2006.01)
*H01S 3/04* (2006.01)
*H01S 3/042* (2006.01)

(52) U.S. Cl.
CPC .......... *H01S 3/093* (2013.01); *H01S 3/09415* (2013.01); *H01S 3/094049* (2013.01); *H01S 3/1095* (2013.01); *H01S 3/1666* (2013.01); *H01S 3/042* (2013.01); *H01S 3/0405* (2013.01); *H01S 3/0621* (2013.01); *H01S 3/1618* (2013.01)

(58) Field of Classification Search
CPC ........ H01S 3/093; H01S 3/1618; H01S 3/042; H01S 3/0405
See application file for complete search history.

(56) References Cited

U.S. PATENT DOCUMENTS

| | | | |
|---|---|---|---|
| 6,185,236 B1 * | 2/2001 | Eichenholz | H01S 3/16 372/39 |
| 6,327,282 B2 * | 12/2001 | Hammons | H01S 3/109 372/20 |
| 6,551,528 B1 * | 4/2003 | Sasaki | H01S 3/109 372/21 |
| 2003/0039274 A1 * | 2/2003 | Neev | H01S 3/0627 372/10 |
| 2014/0211301 A1 * | 7/2014 | Starodoumov | H01S 3/0941 359/341.5 |
| 2015/0303641 A1 * | 10/2015 | Hill | H01S 3/042 372/34 |

FOREIGN PATENT DOCUMENTS

| | | | | |
|---|---|---|---|---|
| EP | 1067426 A4 * | 2/2005 | ............ | G02F 1/3551 |
| WO | WO-9429937 A2 * | 12/1994 | ............. | H01S 3/109 |
| WO | WO-9626464 A1 * | 8/1996 | ............. | C30B 15/00 |
| WO | WO-0024093 A1 * | 4/2000 | ............. | H01S 3/063 |

* cited by examiner

ALL-SOLID-STATE HIGH-POWER SLAB LASER BASED ON PHONON BAND EDGE EMISSION

TECHNICAL FIELD OF THE DISCLOSURE

The present invention relates to a kind of all-solid-state high-power slab laser based on phonon band-edge emission, belongs to the field of laser technology, and relates to laser and nonlinear crystal device.

BACKGROUND

The phonon band-edge emission is a form of radiation that enables the electrons to interact with phonons during the transition between different energy levels by the coupling effect of electrons and phonons, thus reducing the energy level spacing and increasing the laser radiation wavelength. Through phonon band-edge emission, the radiation of rare earth ytterbium with a wavelength up to 1200 nm can be realized, in combination with the laser self-frequency-doubling effect (i.e. the laser and the frequency doubling are completed in the same crystal, thus obtaining a yellow laser with a wavelength of 560-600 nm.

Chinese Patent Document No. CN105071217A has disclosed a kind of all-solid-state laser using Yb-doped RECOB self-frequency-doubling crystal, which can realize output of yellow light. The laser described in this patent adopts a conventional laser configuration, that is, the excitation light emitted from the excitation source is collimated and focused by the said focusing system, and then injected into the said self-frequency-doubling crystal by the input cavity mirror. This mode has the advantages like good pattern matching and high efficiency, and is suitable for the watt-level low-power laser output [Opt. Lett. 41, 1002 (2016)]. However, it can be known from the basic concept of phonon band edge that the participation of phonons intensifies the thermal effect in the lasing process. In particular, the direction of the temperature gradient in the said laser crystal of the invention is perpendicular to the direction of light propagation. When operating under thermal load conditions, it will produce severe thermal lensing effect and thermal-optical distortion effect, which results in reduced beam quality and even crystal cracking, thus limiting further improvement in laser power.

The slab laser is characterized in that the laser operating substance is slab-shaped and the pump spot is strip-shaped, which can greatly increase the effective pumping volume, without requiring pattern matching in the strip direction. At the same time, the temperature gradient in such laser occurs in the thickness direction of the slab (both sides in the widthwise direction of the slab are thermally insulated). By increasing the heat dissipation area and increasing the laser pumping spot, the thermal lensing effect and thermal-optical distortion effect can be substantially avoided, thus greatly increasing the laser output power. Based on slab design, phonon band-edge emission and self-frequency-doubling effect, high-power yellow laser output may be realized. At present, although slab laser has already been used for high-power laser, it has never been used for laser emitted at the phonon band edge, particularly self-frequency-doubling laser.

DESCRIPTION OF THE DISCLOSURE

Against the disadvantages and development status of the existing technology, the present invention provides a kind of all-solid-state high-power slab laser based on phonon band-edge emission, particularly self-frequency-doubling yellow laser; the present invention is a kind of RECOB crystal laser based on Yb doping with an emission wavelength of 560 nm-600 nm.

SUMMARY OF THE DISCLOSURE

In the present invention, the crystal is cut along the direction of its maximum effective nonlinear coefficient into a slab-shaped crystal, and starting laser oscillation from the band of 1120-1200 nm is realized by the coating, to control the emission frequency. At the same time, by changing the cutting angle of the Yb-doped RECOB crystal of the self-frequency-doubling crystal, realizable effective output of frequency-doubling yellow laser is selected. Besides, the pump light spot is a uniformly distributed rectangular spot. All these have substantially changed the thermal effect and the heat dissipation mode of the crystal. As a result, the heat distribution of the incidence face only differs in the thickness direction of the crystal, meaning that the thermal effect is one-dimensionally distributed, which can effectively suppress the thermal effect of the crystal and greatly increasing the power, thus obtaining high-power yellow laser output.

Terms

High reflectivity: The reflectivity of light at a specific wavelength or band is greater than 99%.

High transmittance: The transmittance of light at a specific wavelength or band is greater than 99%.

Heat sink: A material with higher thermal conductivity (such as copper, silver, etc.) is processed into a specific shape and wrapped on the crystal, and holes are processed and cooling liquid of a constant temperature is connected internally for the purpose of heat dissipation of the crystal, or refrigeration equipment is used externally to keep the material temperature constant, so as to achieve the purpose of heat dissipation of the crystal.

Figure 1:
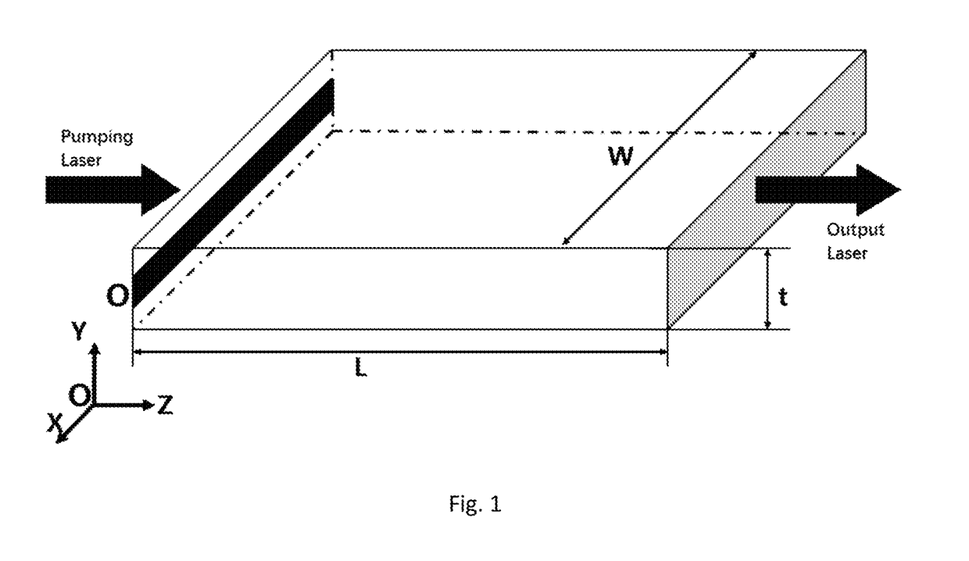
FIG. 1 is the schematic diagram of the slab-shaped crystal. The left is the incidence face. Pumping Laser represents the incidence direction of the pump light, W the width of the crystal, and t the thickness of the crystal, and the two faces of W×t are the light transmission faces of the crystal, where the width W is greater than the thickness t. The crystal length L is the light transmission direction of the crystal and the right is the emission face. Output Laser represents the emission direction of the laser.

Slab-shaped crystal: As shown in FIG. 1, the crystal is a cuboid whose light transmission face is a rectangle, and the width of the light transmission face (indicated by W in the figure) is greater than its thickness (indicated by t in the figure). The crystal length, which is the light transmission direction of the crystal, is indicated by L in the figure. The upper and lower faces are two large faces of the crystal, and are cooled by heat sink.

The Technical Solution of the Present Invention is

A kind of all-solid-state high-power slab laser based on phonon band-edge emission, which is comprised of a pumping source, a focusing system, a resonant cavity and a self-frequency-doubling crystal in the resonant cavity; in which the said pumping source, focusing system and resonant cavity are successively arranged along the optical path, and the said resonant cavity is located at the output end of the said focusing system; in which the said self-frequency-doubling crystal is a Yb-doped RECOB crystal;

The resonant cavity is comprised of an input cavity mirror and an output cavity mirror, in which the said input cavity mirror and the output cavity mirror are respectively coated with a dielectric film, to suppress the starting laser oscillation at the band of 1020-1080 nm and realize the starting laser oscillation at the band of 1120-1200 nm; which is characterized in that:

The said self-frequency-doubling crystal is cut into slab shape along the direction of the crystal's maximum effective nonlinear coefficient;

The said pumping source is a diode laser matrix at 880 nm-980 nm, and the pump light emitted by the said pumping source forms a rectangular spot through the said focusing system and is focused on the light transmission face of the self-frequency-doubling in the said resonant cavity; the said light transmission direction is the lengthwise direction of the slab-shaped crystal.

The all-solid-state high-power slab laser based on phonon band-edge emission in the present invention has realized yellow laser output at 560-600 nm.

The said self-frequency-doubling crystal is located between the input cavity mirror and the output cavity mirror and at the focus of the focusing system. The light intensity and density are strong and the light spot is small at this place, which facilitates the absorption of pump light by the self-frequency-doubling crystal.

According to a preferred embodiment of the present invention, the said input cavity mirror is formed by coating the input mirror with dielectric film A, or coating the light incidence face of the said self-frequency-doubling crystal with dielectric film A. The said dielectric film A has a dielectric film with high transmittance to the pump light at 880 nm-980 nm and a dielectric film with high transmittance at 1020-1080 nm, to increase the effective absorption of pump light while suppressing the starting laser oscillation at the band of 1020-1080 nm. Or, to simplify the coating film, the said dielectric film A at least has a dielectric film with high transmittance at 880 nm-1100 nm.

According to a preferred embodiment of the present invention, the said output cavity mirror is formed by coating the output mirror with dielectric film B, or coating the light emission face of the said self-frequency-doubling crystal with dielectric film B. The said dielectric film B has a dielectric film with high reflectivity to the pump light at 880 nm-980 nm and a dielectric film with high transmittance at 1020-1080 nm, to increase the effective absorption of pump light while suppressing the starting laser oscillation at the band of 1020-1080 nm. Or, to simplify the coating film, the said dielectric film B at least has a dielectric film with high reflectivity at 880 nm-980 nm and with transmittance at 980-1100 nm.

According to a further preferred embodiment of the present invention, in order to realize effective output of yellow laser and reduce the loss of pump light, the said input cavity mirror also needs to be coated with a dielectric film with high reflectivity at bands of 1100 nm-1200 nm and 560 nm-600 nm, and the output cavity mirror needs to be coated with a dielectric film with high reflectivity at 1100 nm-1200 nm and high transmittance at 560 nm-600 nm; in which, the dielectric film with high reflectivity at 1100 nm-1200 nm can realize starting laser oscillation at 1120-1200 nm.

According to a further preferred embodiment of the present invention, the said dielectric film A is a dielectric film with high transmittance at 880-1100 nm and high reflectivity at 1100-1200 nm and 560-600 nm.

According to a further preferred embodiment of the present invention, the said dielectric film B is a dielectric film with high reflectivity at 880-980 nm and 1100-1200 nm and high transmittance at 560-600 nm.

The said pumping source of the present invention is a diode laser matrix with a wavelength of 880 nm-980 nm. Such laser has stable emission wavelength, rectangular emission spot easy for shaping, and high output power.

According to a preferred embodiment of the present invention, the said focusing system is one of the following forms:

a. A single plano-convex cylindrical lens or the assembly of multiple plano-convex cylindrical lenses, b. A single plano-convex lens or the assembly of multiple plano-convex lenses, c. A single biconvex lens or the assembly of multiple biconvex lenses, d. The assembly of a plano-convex lens, a plano-convex cylindrical lens and a plano-concave cylindrical mirror, e. The assembly of a biconvex lens, a plano-convex cylindrical lens and a plano-concave cylindrical mirror.

The assemblies of the focusing system are not limited to these, so as to focus the spot into a rectangular spot. The focal length of the focusing system is 1 cm-30 cm, which depends on the usage; the preferred focal length is 1-10 cm.

According to the embodiment of the present invention in which the dielectric film A is coated on the incidence face of the self-frequency-doubling crystal and the dielectric film B is coated on the emission face of the self-frequency-doubling crystal, the said dielectric film A and dielectric film B form a laser resonant cavity.

According to the present invention, the input cavity mirror and the output cavity mirror are coated with a dielectric film with high transmittance at the band of 980-1100 nm and high reflectivity at 1100 nm-1200 nm, to suppress the starting oscillation at the 1020-1080 nm, realize the laser oscillation at the band of 1120-1200 nm, and producing fundamental-frequency light; the input cavity mirror is coated with a dielectric film with high transmittance at the band of 880 nm-980 nm, and the output cavity mirror is coated with a dielectric film with high reflectivity at the band of 880 nm-980 nm, to increase the effective absorption of the pump light from the pumping source by the self-frequency-doubling crystal.

In the laser resonant cavity of the present invention, in order to reduce the loss of pump light (near 900 nm) and suppress the starting oscillation at the band of 1020-1080 nm, the input cavity mirror and the output cavity mirror need to be coated with a dielectric film with high transmittance at a band covering 1020-1080 nm, which means that the input cavity mirror is coated with a dielectric film with high transmittance at 880-1100 nm in the light transmission direction and the output cavity mirror is coated with a dielectric film with high transmittance at 980-1100 nm; in order to realize effective output at the yellow light band, the input cavity mirror needs to be coated with a dielectric film with high reflectivity at 1100-1200 nm and 560-600 nm, and the output cavity mirror needs to be coated with a dielectric film with high reflectivity at 1100-1200 nm and high transmittance at 560-600 nm; in order to increase the effective absorption of pump light by the crystal, the output cavity mirror is coated with a dielectric film with high reflectivity at 880-980 nm.

According to a preferred embodiment of the present invention, the said Yb-doped RECOB crystal is one of Yb-doped GdCOB, Yb-doped LaCOB and Yb-doped YCOB, or a mixed crystal formed by 2 or 3 of Yb-doped GdCOB, Yb-doped LaCOB and Yb-doped YCOB; the preferred doping concentration of ytterbium ion in the said Yb-doped RECOB crystal is 1 at. %-50 at. %, and the most preferred is 6 at. %-10 at. %.

According to the present invention, the said Yb-doped RECOB crystal is commercially available or prepared according to the existing technology.

According to a preferred embodiment of the present invention, the light transmission face of the said self-frequency-doubling crystal is rectangular. After being polished, the light transmission face is coated or not coated with a dielectric film. The light transmission direction of the self-frequency-doubling crystal is the lengthwise direction of the crystal, and the length is 0.5 mm-50 mm; the thickness of the crystal is 0.4 mm-2 mm, and the width of the self-frequency-doubling crystal is greater than the thickness of the crystal. According to a further preferred embodiment, the self-frequency-doubling crystal has a length of 6 mm-10 mm, a width of 6-12 mm, and a thickness of 0.5-1 mm. Changing the length of the crystal will not affect the band of laser output but will affect the laser efficiency. The efficiency is the best when the crystal length is 6 mm-10 mm. In particular, for self-frequency-doubling crystal, the frequency is the highest when the length is 8 mm.

According to a preferred embodiment of the present invention, the two large faces (the two larger faces perpendicular to the light transmission face) is cooled by heat sink, which facilitates heat dissipation of the laser.

According to a preferred embodiment of the present invention, the light transmission direction of the said self-frequency-doubling crystal is the phase matching direction of self-frequency doubling. It means that when the crystal is cut along the direction of the maximum effective nonlinear coefficient of its non-principal plane, the optimum phase matching direction is: forming an angle of $(120°±10°)$ to axis Z in the principal axis direction with the maximum crystal refractive index and an angle of $-(40°±10°)$ to axis X in the principal axis direction with the minimum crystal refractive index. This angle is a direction for yellow light self-frequency doubling, and its effect is only the realization of self-frequency doubling at 560-600 nm. By changing the cutting direction of the crystal and thus realizing phase matching, the output of yellow laser is obtained.

According to the present invention, a preferred embodiment is:

A kind of all-solid-state high-power slab laser based on phonon band-edge emission, which is comprised of a pumping source, a focusing system, an input cavity mirror, a self-frequency-doubling crystal and an output cavity mirror successively ranged along the optical path; the said pumping source is a diode laser matrix with a wavelength of 880 nm-980 nm; the said self-frequency-doubling crystal is a Yb-doped COB crystal and is cut into slab shape along the direction of the crystal's maximum effective nonlinear coefficient, and the said self-frequency-doubling crystal is located at the focus of the focusing system; the said input cavity mirror and the output cavity mirror form a laser resonant cavity; the input cavity mirror is the input mirror coated with dielectric film A with high transmittance at 880-1100 nm and high reflectivity at 1100-1200 nm and 560-600 nm; the output cavity mirror is the output mirror coated with dielectric film B with high reflectivity at 880-980 nm and 1100-1200 nm and high transmittance at 980-1100 nm and 560-600 nm.

According to the present invention, another preferred embodiment is:

A kind of all-solid-state high-power slab laser based on phonon band-edge emission, which is comprised of a pumping source, a focusing system, an input cavity mirror, a self-frequency-doubling crystal and an output cavity mirror successively ranged along the optical path; the said pumping source is a diode laser matrix with a wavelength of 880 nm-980 nm; the said self-frequency-doubling crystal is a Yb-doped RECOB crystal and is cut into slab shape along the direction of the crystal's maximum effective nonlinear coefficient, and the said self-frequency-doubling crystal is located at the focus of the focusing system; the input cavity mirror is the incidence face of the self-frequency-doubling crystal coated with dielectric film A with high transmittance at 880-1100 nm and high reflectivity at 1100-1200 nm and 560-600 nm; the output cavity mirror is the emission face of the self-frequency-doubling crystal coated with dielectric film B with high reflectivity at 880-980 nm and 1100-1200 nm and high transmittance at 980-1100 nm and 560-600 nm; the said dielectric film A and dielectric film B form a laser resonant cavity.

The all-solid-state high-power slab laser based on phonon band-edge emission in the present invention is a special laser, which not only changes the shape of the crystal, that is, the crystal used is a slab-shaped crystal, but uses a uniformly distributed rectangular spot as the pump light spot as well, which has substantially changed the thermal effect and the heat dissipation mode of the crystal. As a result, the heat distribution of the incidence face only differs in the thickness direction of the crystal, meaning that the thermal effect is one-dimensionally distributed; besides, the heat dissipation is done through two large faces of the crystal, which has greatly increased the heat dissipation of the crystal, thus effectively suppressing the thermal effect of the crystal caused by the increase of the pumping power and greatly increasing the power.

Technical features and beneficial effects of the present invention:

1. The self-frequency-doubling crystal is Yb-doped RECOB crystal. The basis of a self-frequency-doubling lasing process is a self-frequency-doubling crystal which combines laser and frequency doubling effect, and the research and development of self-frequency-doubling crystal also need to take into account the cost and easiness of preparation. Otherwise, it is difficult to meet the needs of mass production. Therefore, in the design and development of self-frequency-doubling high-power yellow-light slab laser, it is also necessary to consider the growth method of self-frequency-doubling crystal. For example, crystal growth by flux method needs a long period and high cost, while crystal growth by Czoehralski method can obtain large-size crystals in a short period of time, thus reducing the cost of self-frequency-doubling crystals. The Yb-doped RECOB crystal in the present invention can be prepared by the existing Czoehralski method. Czoehralski method is a common method for crystal growth. It can obtain large-size and high-quality crystals in a short time, and the crystals are easy to obtain, thus reducing the difficulty of production and lowering the cost.

2. The pump light emitted by the pumping source of the present invention is collimated and focused in the fast axis direction by the focusing system, and then incident on the self-frequency-doubling crystal by the input cavity mirror. The crystal absorbs the pump energy and undergoes energy level transition. By means of coating, starting laser oscillation at the band of 1120-1200 nm is realized and the fundamental-frequency light is formed. The fundamental-frequency light performs frequency doubling using the frequency doubling effect of the self-frequency-doubling crystal, and realize output of yellow laser at 560-600 nm.

3. The all-solid-state high-power slab laser based on phonon band-edge emission in the present invention adopts Yb-doped RECOB crystal combining laser and frequency doubling effect, and realizes yellow laser output through frequency selection by coating. In terms of output power, it has broken through the current situation that it is difficult to achieve high power in existing lasers and can realize stable high-power laser output. In structure, it has broken through the feature of existing high-power yellow lasers of requiring at least two (or even more) crystals and has the advantages of simple, stable and compact structure and small volume. Besides, it also reduces the difficulty of production debugging and processing, is easy to install and debug, ensures the consistency in the production process, and facilitates mass production. In the lasing process, it has broken through the complex sum-frequency process of existing lasers through simple design of the resonant cavity, and has the advantages of low laser threshold and being easy to realize. The resonant cavity is a linear cavity with good stability and reliability and is convenient for component replacement and debugging.

4. The self-frequency-doubling crystal of the present invention is Yb-doped RECOB crystal. The light transmission direction of the said self-frequency-doubling crystal is the phase matching direction of self-frequency doubling, which means that the crystal is cut along the direction of the maximum effective nonlinear coefficient of its non-principal plane. The light transmission face of the said self-frequency-doubling crystal is rectangular, the two large faces of the crystal is cooled by heat sink, and the pump light is uniformly distributed along the widthwise direction of the crystal, so the thermal effect is one-dimensional (only in the direction perpendicular to the large faces of the crystal). Compared with conventional rod-shaped laser crystals, the thermal effect is greatly reduced. Therefore, such laser can withstand higher pump power and output laser of higher power. Now yellow laser has realized laser output power of 5 W and above, which is significantly higher than the power of 1.08 W of existing self-frequency-doubling yellow laser.

DETAILED DESCRIPTION

The present invention is further described in combination with the attached figures and embodiments as follows, but the protection scope of the present invention is not limited to this.

Unless otherwise specified, all components used in the embodiments reflect the state of the art.

Embodiment 1

Figure 2:
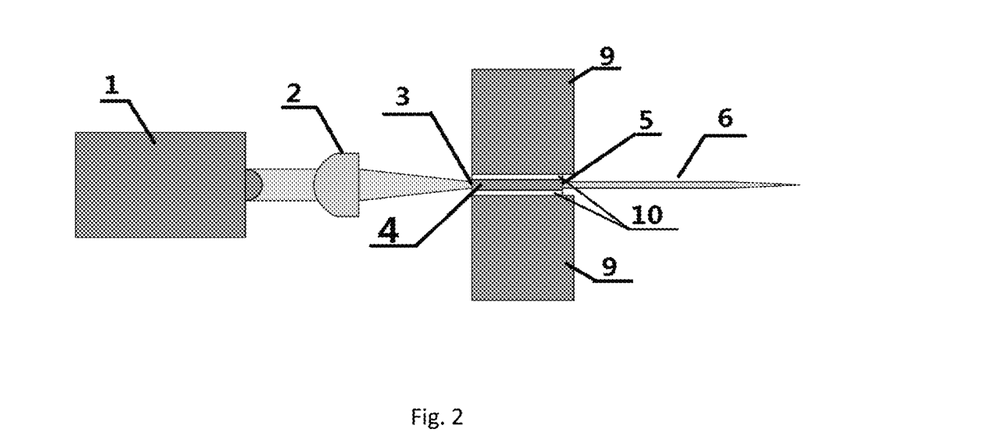
FIG. 2 is the schematic diagram of the all-solid-state high-power slab laser based on phonon band-edge emission in Embodiment 1; where 1 is the pumping source, 2 the focusing system, 3 the dielectric film A, 4 the self-frequency-doubling crystal, 5 the dielectric B and 6 the laser output.
Figure 3:
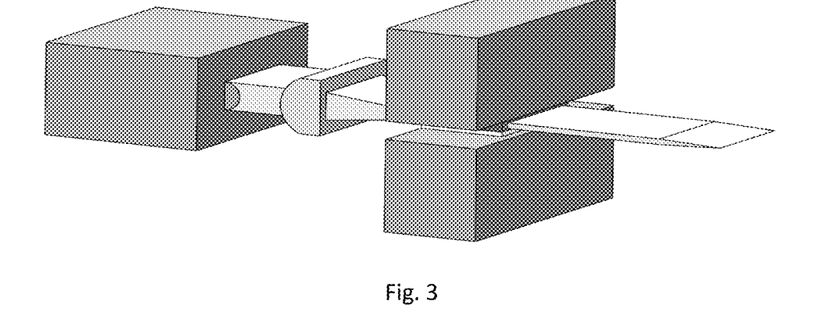
FIG. 3 is the solid figure of FIG. 2.
Figure 7:
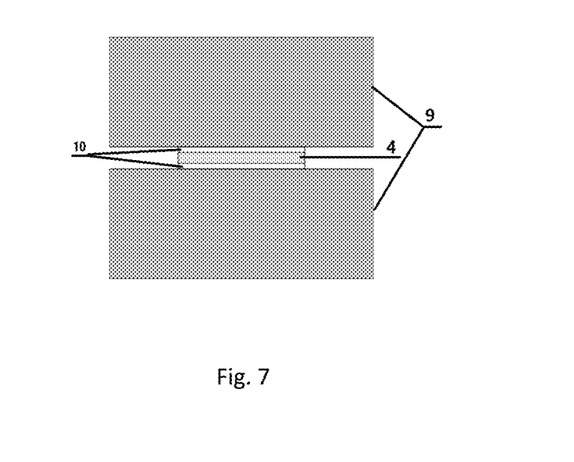
FIG. 7 is the heat dissipation structure of the crystal of the all-solid-state high-power slab laser based on phonon band-edge emission in Embodiment 1, where 9 is the heat sink and 10 is the indium foil.

A kind of all-solid-state high-power slab laser based on phonon band-edge emission, with a structure as shown in FIGS. 2 and 3, which is comprised of a pumping source 1, a focusing system 2, and a self-frequency-doubling crystal 4 successively arranged along the optical path. The pumping source 1 is a diode laser matrix with emission center wavelength of 976 nm; the focusing system 2 is comprised of a piano-convex cylindrical lens with a focal length of 6.35 cm; the self-frequency-doubling crystal 4 is a Yb-doped YCOB crystal with a doping concentration of ytterbium ion of 20 at. %, the crystal length in the light transmission direction is 8 mm, the light transmission face is a rectangle of 12×1 mm$^2$ polished, the two large faces of the crystal is cooled by the heat sink 9 (as shown in FIG. 7), the cutting direction is along the phase matching direction of the maximum effective nonlinear coefficient, the optimum phase matching direction is: forming an angle of (120°±1°) to axis Z and an angle of −(38°±2°) to axis X, and the said self-frequency-doubling crystal 4 is located at the focus of the focusing system; the incidence face of the self-frequency-doubling crystal 4 is coated with dielectric film A with high transmittance at 880-1100 nm and high reflectivity at 1100-1200 nm and 560-600 nm, as represented by 3 in FIG. 2; the emission face is coated with dielectric film B with high reflectivity at 880-980 nm and 1100-1200 nm and high transmittance at 980-1100 nm and 560-600 nm, as represented by 5 in FIG. 2; the dielectric film A 3 and dielectric film B 5 form a laser resonant cavity.

Figure 4:
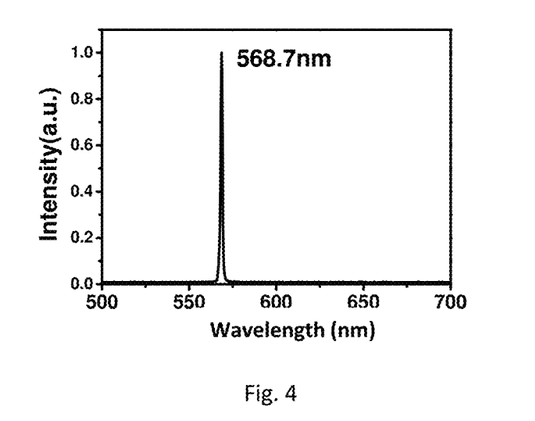
FIG. 4 is the laser output spectrum of the all-solid-state high-power slab laser based on phonon band-edge emission in Embodiment 1, where the x-coordinate represents the wavelength (nm) and the y-coordinate represents the intensity.

After starting the pumping source 1 and increasing the pumping power, 5 W high-power yellow laser output at band of 568.7 nm can be obtained under the pumping power of 65 W. The output wavelength is as shown in FIG. 4.

Embodiments 2-4

A kind of all-solid-state high-power slab laser based on phonon band-edge emission, as described in Embodiment 1, which differs in the self-frequency-doubling crystal 4. The length in light transmission direction of the Yb-doped YCOB crystal is respectively 4 mm, 6 mm and 10 mm. Other conditions and components are consistent with those described in Embodiment 1. After starting the pumping source 1 and increasing the pumping power, yellow laser output at the band of about 570 nm can be realized in all cases.

Embodiments 5-8

A kind of all-solid-state high-power slab laser based on phonon band-edge emission, as described in Embodiment 1, which differs in the self-frequency-doubling crystal 4. The light transmission face of the Yb-doped YCOB crystal is respectively $6\times 1$ mm$^2$, $8\times 1$ mm$^2$, $10\times 1$ mm$^2$ and $12\times 0.5$ mm$^2$. Other conditions and components are consistent with those described in Embodiment 1. Yellow laser output at the band of about 570 nm can be realized in all cases. The four kinds of light transmission face have different lengths and can be used to match spot sizes focused by different pumping sources. The spot length is kept equivalent to the crystal width.

Embodiment 9

Figure 5:
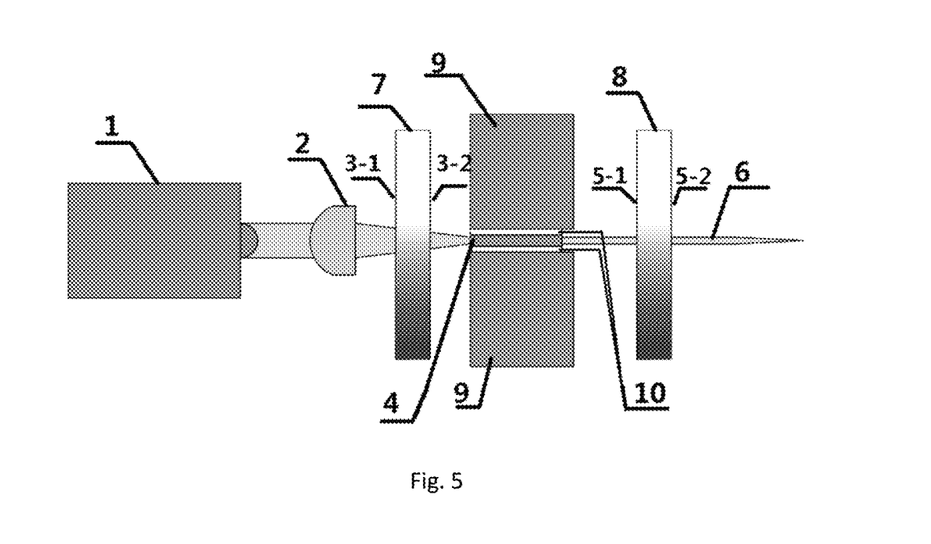
FIG. 5 is the schematic diagram of the all-solid-state high-power slab laser based on phonon band-edge emission in Embodiment 9; where 7 is the input cavity mirror and 8 is the output cavity mirror. 3-1 is a dielectric film with high transmittance at 880-1100 nm, and 3-2 is a dielectric film with high reflectivity at 1100-1200 nm and 560-600 nm. 5-1 is a dielectric film with high reflectivity at 880-980 nm and 1100-1200 nm, and 5-2 is a dielectric film with high transmittance at 980-1100 nm and 560-600 nm.
Figure 6:
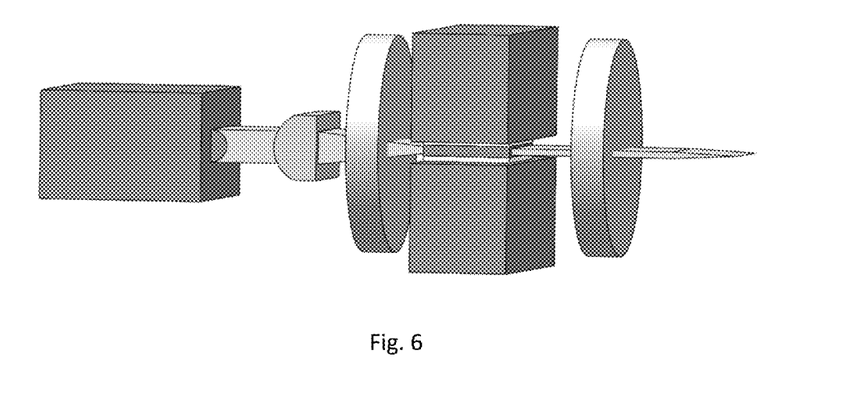
FIG. 6 is the solid figure of FIG. 5.

A kind of all-solid-state high-power slab laser based on phonon band-edge emission, with a structure as shown in FIGS. 5 and 6, which is comprised of a pumping source 1, a focusing system 2, an input cavity mirror 7, a self-frequency-doubling crystal 4 and an output cavity mirror 8 successively arranged along the optical path.

The pumping source 1 is a diode laser matrix with emission center wavelength of 976 nm; the focusing system 2 is comprised of a piano-convex cylindrical lens with a focal length of 6.35 cm; the input cavity mirror 7 and an output cavity mirror 8 form a laser resonant cavity. The input cavity mirror 7 is a plano-plano lens, and the light transmission face is coated with a dielectric film with high transmittance at 880-1100 nm (as represented by 3-1 in FIG. 5) and a dielectric film with high reflectivity at 1100-1200 nm and 560-600 nm (as represented by 3-2 in FIG. 5), which form the dielectric film A together (as represented by 3 in FIG. 2); the self-frequency-doubling crystal 4 is a Yb-doped YCOB crystal with a doping concentration of ytterbium ion of 20 at. %, the crystal length in the light transmission direction is 8 mm, the light transmission face is a rectangle of $12\times 1$ mm$^2$, the two large faces of the crystal is cooled by the heat sink 9, the light transmission face is polished and coated with a dielectric film with high transmittance at 880 nm-1200 nm and 560 nm-600 nm, the cutting direction is along the phase matching direction of the maximum effective nonlinear coefficient, and the cutting angle is: $(120°\pm 1°)$ to axis Z and $-(38°\pm 2°)$ to axis X. And the said self-frequency-doubling crystal 4 is located at the focus of the focusing system; the output cavity mirror 8 is coated with a dielectric film with high reflectivity at 880-980 nm and 1100-1200 nm (as represented by 5-1 in FIG. 5) and a dielectric film with high transmittance at 980-1100 nm and 560-600 nm (as represented by 5-1 in FIG. 5), which form dielectric film B together (as represented by 5 in FIG. 2).

Figure 8:
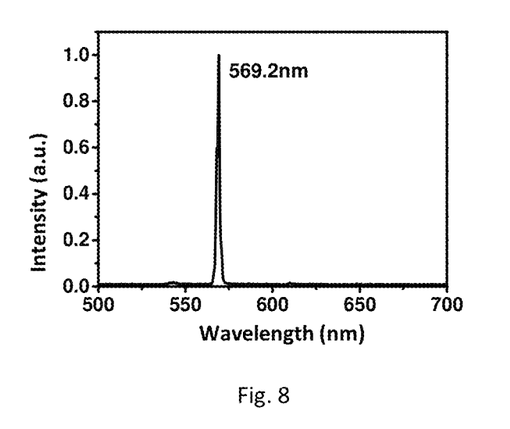
FIG. 8 is the laser output spectrum of the all-solid-state high-power slab laser based on phonon band-edge emission in Embodiment 9, where the x-coordinate represents the wavelength (nm) and the y-coordinate represents the intensity.

After starting the pumping source 1, increasing the pumping power, and adjusting the laser resonant cavity and the self-frequency-doubling crystal 4, laser output at the band of 569.2 nm is obtained. The output wavelength is as shown in FIG. 8.

Embodiments 10-12

A kind of all-solid-state high-power slab laser based on phonon band-edge emission, as described in Embodiment 9, which differs in the self-frequency-doubling crystal 4. The length in light transmission direction of the Yb-doped YCOB crystal is respectively 4 mm, 6 mm and 10 mm. Other conditions and components are consistent with those described in Embodiment 9. After starting the pumping source 1 and increasing the pumping power, yellow laser output at the band of about 570 nm can be realized in all cases.

Embodiments 13-16

A kind of all-solid-state high-power slab laser based on phonon band-edge emission, as described in Embodiment 9, which differs in the self-frequency-doubling crystal 4. The light transmission face of the Yb-doped YCOB crystal is respectively $6\times 1$ mm$^2$, $8\times 1$ mm$^2$, $10\times 1$ mm$^2$ and $12\times 0.5$ mm$^2$. Other conditions and components are consistent with those described in Embodiment 9. Yellow laser output at the band of about 570 nm can be realized in all cases after starting the pumping source 1 and increasing the pumping power. Different lengths of the light transmission face can be used to match spot sizes focused by different pumping sources.

Embodiment 17

Figure 9:
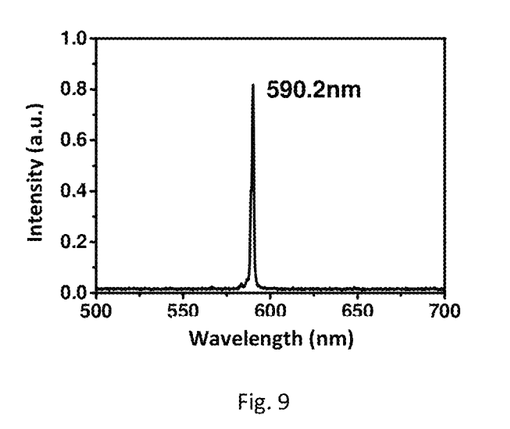
FIG. 9 is the laser output spectrum of the all-solid-state high-power slab laser based on phonon band-edge emission in Embodiment 17, where the x-coordinate represents the wavelength (nm) and the y-coordinate represents the intensity.

A kind of all-solid-state high-power slab laser based on phonon band-edge emission, as described in Embodiment 1, which differs in that the cutting angle of the Yb-doped YCOB crystal of the self-frequency-doubling crystal is: $(120°\pm 1°)$ to axis Z and $-(34°\pm 2°)$ to axis X. Other conditions and components are consistent with those described in Embodiment 1. After starting the pumping source 1 and increasing the pumping power, yellow laser output at the band of about 590 nm can be realized. The output wavelength is 590.2 nm, as shown in FIG. 9.

Embodiment 18

Figure 10:
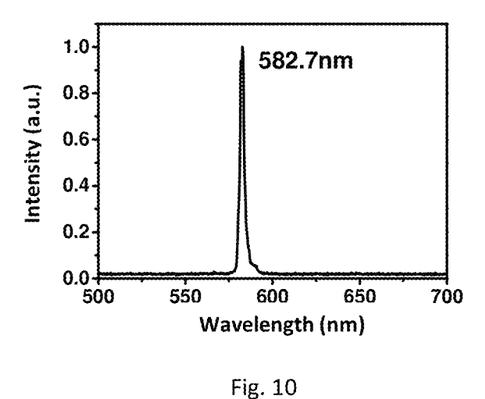
FIG. 10 is the laser output spectrum of the all-solid-state high-power slab laser based on phonon band-edge emission in Embodiment 18, where the x-coordinate represents the wavelength (nm) and the y-coordinate represents the intensity.

A kind of all-solid-state high-power slab laser based on phonon band-edge emission, as described in Embodiment 1, which differs in that the self-frequency-doubling crystal is a Yb-doped GdCOB crystal and the doping concentration of ytterbium ion is 1 at. %. The cutting angle of the crystal is: $(120°\pm 1°)$ to axis Z and $-(46°\pm 2°)$ to axis X. Other conditions and components are consistent with those described in Embodiment 1. After starting the pumping source 1 and increasing the pumping power, yellow laser output at the band of 580 nm can be realized. The output wavelength is 582.7 nm, as shown in FIG. 10.

Embodiment 19

Figure 11:
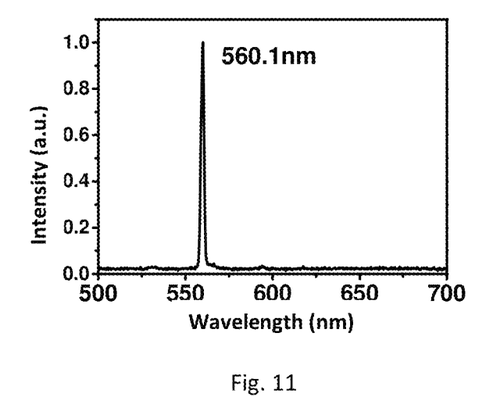
FIG. 11 is the laser output spectrum of the all-solid-state high-power slab laser based on phonon band-edge emission in Embodiment 19, where the x-coordinate represents the wavelength (nm) and the y-coordinate represents the intensity.

A kind of all-solid-state high-power slab laser based on phonon band-edge emission, as described in Embodiment 1, which differs in the cutting angle of the Yb-doped YCOB crystal of the self-frequency-doubling crystal. The crystal is cut along the phase matching direction of the maximum effective nonlinear coefficient at 1120 nm. Other conditions and components are consistent with those described in Embodiment 1. After starting the pumping source 1 and increasing the pumping power, yellow laser output at the band of 560 nm can be realized. The output wavelength is 560.1 nm, as shown in FIG. 11.

Embodiment 20

Figure 12:
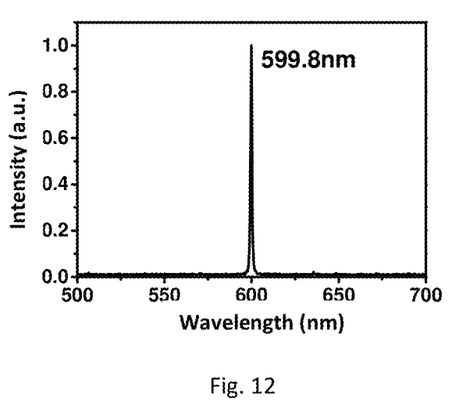
FIG. 12 is the laser output spectrum of the all-solid-state high-power slab laser based on phonon band-edge emission in Embodiment 20, where the x-coordinate represents the wavelength (nm) and the y-coordinate represents the intensity.

A kind of all-solid-state high-power slab laser based on phonon band-edge emission, as described in Embodiment 1, which differs in the cutting angle of the Yb-doped YCOB crystal of the self-frequency-doubling crystal. The crystal is cut along the phase matching direction of the maximum effective nonlinear coefficient at 1200 nm. Other conditions and components are consistent with those described in Embodiment 1. After starting the pumping source 1 and increasing the pumping power, yellow laser output at the band of 600 nm can be realized. The output wavelength is 599.8 nm, as shown in FIG. 12.

What is claimed is:

1. An all-solid-state high-power slab laser based on phonon band-edge emission, comprising a pumping source, a focusing system, a resonant cavity and a self-frequency-doubling crystal in the resonant cavity; wherein the pumping source, the focusing system and the resonant cavity are successively arranged along an optical path; the resonant cavity is located at an output end of the focusing system; the self-frequency-doubling crystal is a Yb-doped ReCa4O (BO3)3 (ReCOB) crystal where Yb is ytterbium, Re is another rare earth element consisting of Gd or La, and COB is calcium oxyborate, and wherein the Yb-doped ReCOB crystal is Yb-doped GdCOB or Yb-doped La COB, or a combination of the two; wherein a light transmission direction of the self-frequency-doubling crystal is a lengthwise direction thereof, and wherein the self-frequency-doubling crystal has a length of 6 mm-10 mm, a width of 6-12 mm, and a thickness of 0.5-1 mm;

the resonant cavity comprises an input cavity mirror and an output cavity mirror; the input cavity mirror and the output cavity mirror are respectively coated with a dielectric film for suppressing a starting laser oscillation in a band range of 1020 nm-1080 nm and realizing a starting laser oscillation in a band range of 1120 nm-1200 nm;

the self-frequency-doubling crystal is cut into a slab shape along a direction having a maximum effective nonlinear coefficient;

the pumping source is a diode laser matrix configured to emit a pump light in a band of 880 nm-980 nm; pump lights emitted by the pumping source forms a rectangular spot through the focusing system and is focused on a light transmission face of the self-frequency-doubling crystal in said resonant cavity; said self-frequency-doubling crystal is located at a focus of the focusing system, wherein the light transmission face of the self-frequency-doubling crystal is rectangular; and two large faces of the self-frequency-doubling crystal are each cooled by a heat sink, the light transmission direction of said self-frequency-doubling crystal is a phase matching direction of self-frequency doubling.

2. The slab laser of claim 1, wherein a focal length of the focusing system is 1 cm-30 cm.

3. The slab laser of claim 1, wherein the self-frequency-doubling crystal is cut along an optimum phase matching direction, i.e. the direction of the effective nonlinear coefficient of the non-principal plane.

4. The slab laser of claim 1, wherein the input cavity mirror is formed by coating a light incidence face of the self-frequency-doubling crystal with the dielectric film A; said dielectric film A has a first dielectric film with a high transmittance to the pump light at 880 nm-980 nm and a second dielectric film with high transmittance at 1020 nm-1080 nm, or the dielectric film A has a dielectric film with high transmittance at 880 nm-1100 nm.

5. The slab laser of claim 4, wherein the output cavity mirror is formed by coating a light emission face of the self-frequency-doubling crystal with the dielectric film B; the dielectric film B has a first dielectric film with high reflectivity to the pump light at 880 nm-980 nm and a second dielectric film with high transmittance at 1020 nm-1080 nm; or the dielectric film B high reflectivity at 880 nm-980 nm and high transmittance at 980 nm-1100 nm.

6. The slab laser of claim 1, wherein the input cavity mirror also has a high reflectivity at bands of 1100 nm-1200 nm and 560 nm-600 nm, and the output cavity mirror also has high reflectivity at 1100 nm-1200 nm and high transmittance at 560 nm-600 nm.

7. The all-solid-state high-power slab laser based on phonon band-edge emission of claim 1, wherein the focusing system is a single plano-convex cylindrical lens or an assembly of multiple plan-convex cylindrical lenses.

8. The all-solid-state high-power slab laser based on phonon band-edge emission of claim 1, wherein the focusing system is a single plano-convex lens or an assembly of multiple plano-convex lenses.

9. The all-solid-state high-power slab laser based on phonon band-edge emission of claim 1, wherein the focusing system is an assembly of multiple biconvex lenses.

10. The all-solid-state high-power slab laser based on phonon band-edge emission of claim 1, wherein the focusing system is an assembly of a plano-convex lens, a plano-convex cylindrical lens and a plano-concave cylindrical mirror.

11. The all-solid-state high-power slab laser based on phonon band-edge emission of claim 1, wherein the focusing system is an assembly of a biconvex lens, a plano-convex cylindrical lens and a plano-concave cylindrical mirror.

* * * * *